United States Patent [19]
Wang et al.

[11] Patent Number: 5,926,481
[45] Date of Patent: Jul. 20, 1999

[54] TIMER INTERRUPT METHOD FOR ACHIEVING QUALITY-OF-SERVICE CRITERIA IN A MEDIA-ON-DEMAND SERVER SYSTEM

[75] Inventors: Chi-Lung Wang, Hsinchu; Chin-Tsing Deng, Hou Li Country; Ren-Kewi Yang, Keelung; Kai-Chung Hsueh, Kaohsiung; Shin-Hung Kao, Taipei, all of Taiwan

[73] Assignee: Industrial Technology Research Institute, Hsinchu, Taiwan

[21] Appl. No.: 08/834,423

[22] Filed: Apr. 16, 1997

[51] Int. Cl.[6] ...................................................... H04N 7/62
[52] U.S. Cl. .......................... 370/465; 370/329; 370/337; 370/347; 370/468; 370/431; 370/437; 370/442
[58] Field of Search ..................................... 370/329, 337, 370/347, 465, 468, 431, 437, 442

[56] References Cited

U.S. PATENT DOCUMENTS 5,533,021  7/1996  Branstad et al. ........................ 370/60.1

OTHER PUBLICATIONS

Kenchammana–Hosekote, Scheduling Continuous Media in a Video–On–Demand Server, P. 20, May. 1994.

*Primary Examiner*—Jeffery A. Hofsass
*Assistant Examiner*—Rafael A. Perez-Pineiro
*Attorney, Agent, or Firm*—Proskauer Rose LLP

[57] ABSTRACT

An implementation method is described that efficiently achieves Quality-of-Service (QoS) criteria in a Media-on-Demand (MOD) server system. A MOD server system comprises a media server connected to a plurality of client stations via a shared transmission medium, such as a LAN network. To guarantee the QoS, the output rate of each data stream (of data requested by a client) needs to be specified individually. The inventive timer interrupt driven method achieves the necessary QoS, while reducing the complexity of conventional systems. In particular, a set of hardware timers is used to control the data rates. Each data request is handled by an individual timer, hence, different data streams may have different data request rates. Such design provides several advantages over other implementations, such as low overhead and high scalability.

9 Claims, 4 Drawing Sheets

TIMER INTERRUPT METHOD FOR ACHIEVING QUALITY-OF-SERVICE CRITERIA IN A MEDIA-ON-DEMAND SERVER SYSTEM

FIELD OF THE INVENTION

The present invention relates to a method for efficiently processing requests to read and write data within predetermined Quality-of-Service (QoS) criteria in a Media-on-Demand (MOD) server system, and, more particularly, relates to a method of dynamically using a programmable timer corresponding to the requested data for transferring the data with a constant data rate within QoS criteria from a server site to each requesting client.

BACKGROUND OF THE INVENTION

A typical Media-on-Demand (MOD) network system, which can be utilized in the present invention, is illustrated in FIG. 1. In FIG. 1, MOD system 10 includes a media server 7 connected to a plurality of clients 5 over a shared transmission medium 8. MOD system 10 is applicable to supporting the transmission of data streams on a local area network (LAN), a wide area network (WAN) or on a stand-alone system wherein a video storage system is accessed to retrieve or store data belonging to a plurality of data streams. For example, in the stand-alone system, the data streams may be retrieved from data storage for display locally on a monitor.

A video storage system (not shown) for storing a plurality of video files is connected to server 7. Illustratively, the video storage system is a disk storage system. However, other types of storage systems may be used such as tape decks, laser disks, CD ROMs, etc. A plurality of the clients 5 typically wish to access the disk storage system simultaneously to retrieve video files stored in the disk storage system (or to write video files into the disk storage system). As indicated above, the invention is also applicable to a stand-alone system wherein a disk storage system is accessed to retrieve streams for display on a local monitor.

In MOD system 10, any client 5 can select whatever the user wishes to view. Media server 7 supports real-time media to clients through the network, including movies, television programs, home shopping, interactive commercials, and home and business information services, such as video-based real-estate services.

For server 7 to support such real-time media, the server typically integrates various types of Quality of Service (QoS) criteria within one system framework. For example, in an asynchronous transfer mode (ATM) system, the QoS sets the tolerances, i.e. performance requirements, for the data packet cell loss ratio, the cell transfer delay, and the delay jitter.

To meet the performance requirements, an MOD server needs flexibility to utilize the available resources. Such resources include disk storage I/O, network bandwidth frequency, the number of I/O ports with respect to time, etc. In order to achieve the target performance requirements (e.g., having a large number of clients simultaneously requesting different or identical data, while providing a continuous smooth transmission of requested data streams), the system management of the media server allocates numerous resources according to a number of predetermined QoS criteria. To implement the QoS, the system management performs a number of tasks when a new data request is generated.

First, the system management performs a resource evaluation, where the system evaluates the current available resources. Next, the system management optimizes the resources allocated to all existing streams by reallocating or adjusting the current resources if necessary. Finally, the system management allocates the required resource to the new request and updates the available resource information.

As stated, a critical issue to the success of providing continuous media is to transmit streams of the requested data smoothly. In other words, the period between adjacent data streams of the requested data has to be within a certain time interval. Otherwise, audio or visual breaks will occur causing "jitters". Thus, conventional algorithms for retrieving and storing data are highly time-dependent. To guarantee that the QoS criteria are met (to avoid jitters), the output rate of each stream must be dynamically changeable.

There are two basic approaches to supporting continuous media in operating file systems. In the first approach, the organization of audio and video files are altered and optimized, especially for distributed hierarchical storage. The basic idea is to improve the throughput and capacity by storing the data of each audio and video file on several volumes. Disk I/O bandwidth is maximized by striping, while seek times are minimized by grouping and sorting.

In the second approach, the organization of the data files on the storage disk is not altered as the necessary real-time support is provided through complex and specific disk-scheduling algorithms. Additionally, buffers may be provided to smooth the flow of the data streams.

No matter which approach is adopted, neither of the above file systems can guarantee that the data streams will be transmitted at a constant data rate. Additionally, the algorithms are very complex and consume a large amount of resources. Due to these drawbacks, a new method is herein proposed that substantially guarantees a constant data rate for each data stream with minimal complexity.

It is therefore an object of the present invention to overcome the disadvantages of the prior art.

SUMMARY OF THE INVENTION

A hardware timer array employed to control the data rate, one timer per data stream. Such modification is fairly simple since the timing control for the data rate is shifted from conventional software algorithms to hardware. Hence, overhead can be minimized and the software algorithms can be simplified. During the period of transferring data, a client station can send a message packet to indicate that the buffer in the client is full or empty. If the server receives this message, it can dynamically change the data rate by reprogramming the timer. In addition, various types of QoS can be supported by simple programming of the associated timers.

When the QoS of the MOD system receives a request for data transfer, it preferably divides the request into a plurality of sub-requests. The transfer length of each sub-request is preferably the same, e.g., 64 KB. The QoS system performs each sub-request, by calling the disk driver for reading the requested data and by calling the network driver for transmitting the data, per predetermined time intervals. Thus, the QoS system can transfer the data of the corresponding request with a constant transfer rate. As stated, there is a programmable timer corresponding to each data stream. The QoS system gives each timer an initial value based on the available bandwidth frequency as given by the requesting client. Note that each data stream may have different data rate. When the timer decreases to zero, a timer interrupt occurs, and the QoS system performs the next data transfer.

Using hardware timers, the QOS criteria of the MOD server can be easily achieved. Further, since the QoS system is conceptually OS independent, the algorithm of the QoS is very simple. Therefore, overhead for supporting the QoS can be substantially eliminated, while the performance of the MOD server can be increased. In addition, different data rates can be easily supported and can be dynamically changed.

DETAILED DESCRIPTION OF THE INVENTION

Figure 1:
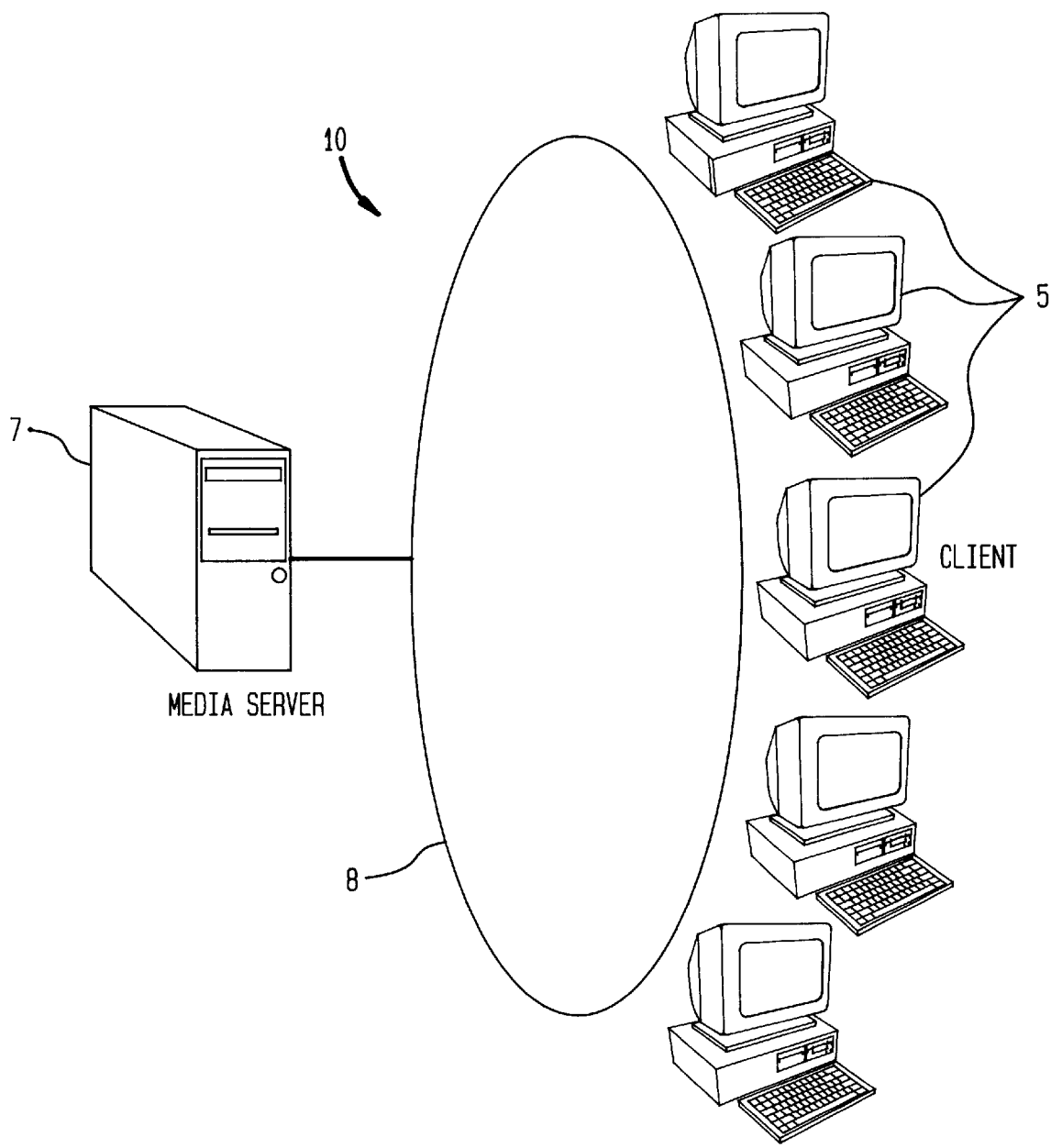
FIG. 1 schematically illustrates a Media-On-Demand system comprising a media server, transmission medium and a plurality of clients.
Figure 2A:
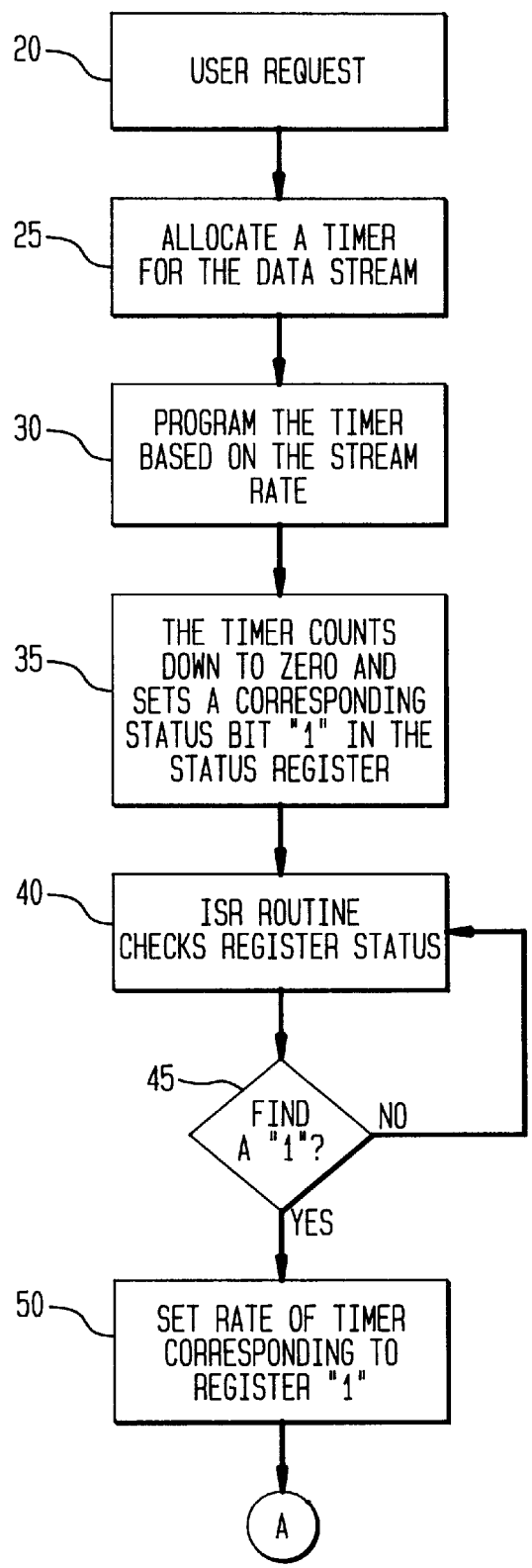
FIGS. 2A and 2B is a flow chart showing the steps of retrieving and transmitting requested data according to the present invention.
Figure 2B:
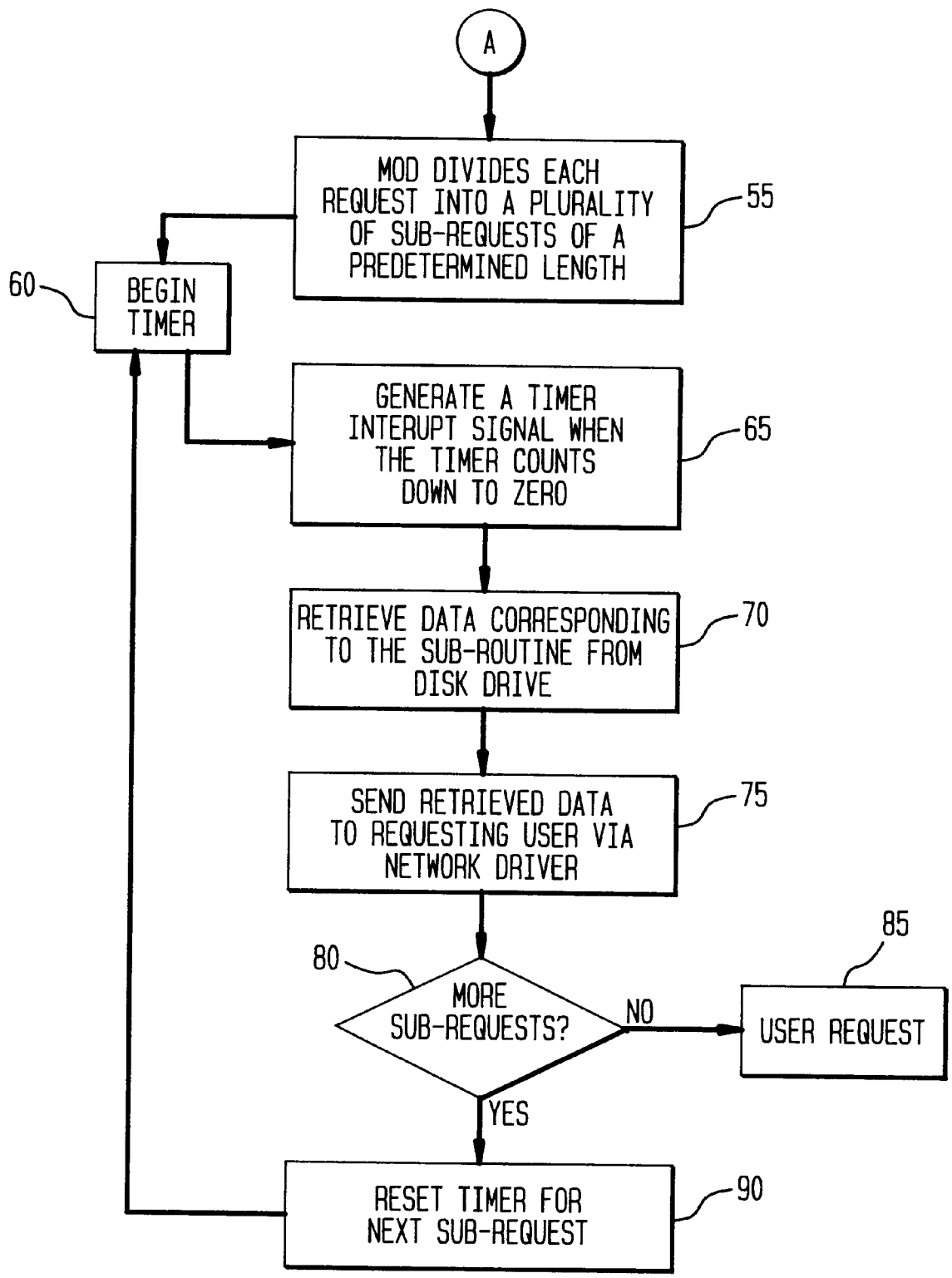

FIGS. 2A, 2B show a flow diagram providing the steps for retrieving and transmitting data streams of requested data. At step 20, a client initiates a request for data to view, e.g., a motion picture. Preferably, along with the request is data characteristic information regarding the available data rate (in Mbits/s), and buffer information. At step 25, the MOD system will allocate a specific data rate timer (for the requested data) from an array of timers 12 (FIGS. 3 and 4) for setting the time intervals for data retrieval and transmission.

With respect to the data rate timers, each timer includes three port registers, namely ControlPort, IndexPort and DataPort. The MOD system issues commands to the timer via the ControlPort, indicates which timer will be programmed via the IndexPort, and sets the timer value via the DataPort. The video server of the MOD system controls the function of the timers, via the above ports, preferably upon receipt of VCR-like control signals such as PLAY, PAUSE, STOP, FAST FORWARD, and REWIND to program, reprogram, pause, resume, and stop the corresponding timers.

Figure 3:
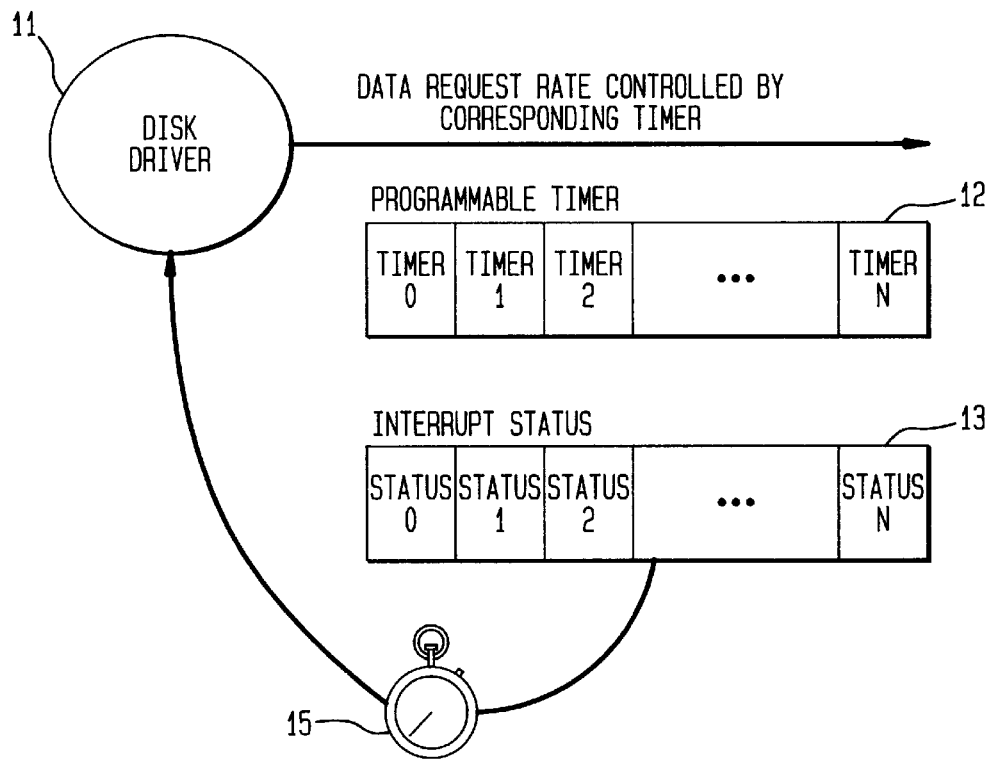
FIG. 3 illustrates the relationship of the disk driver with respect to the timers according to the present invention.
Figure 4:
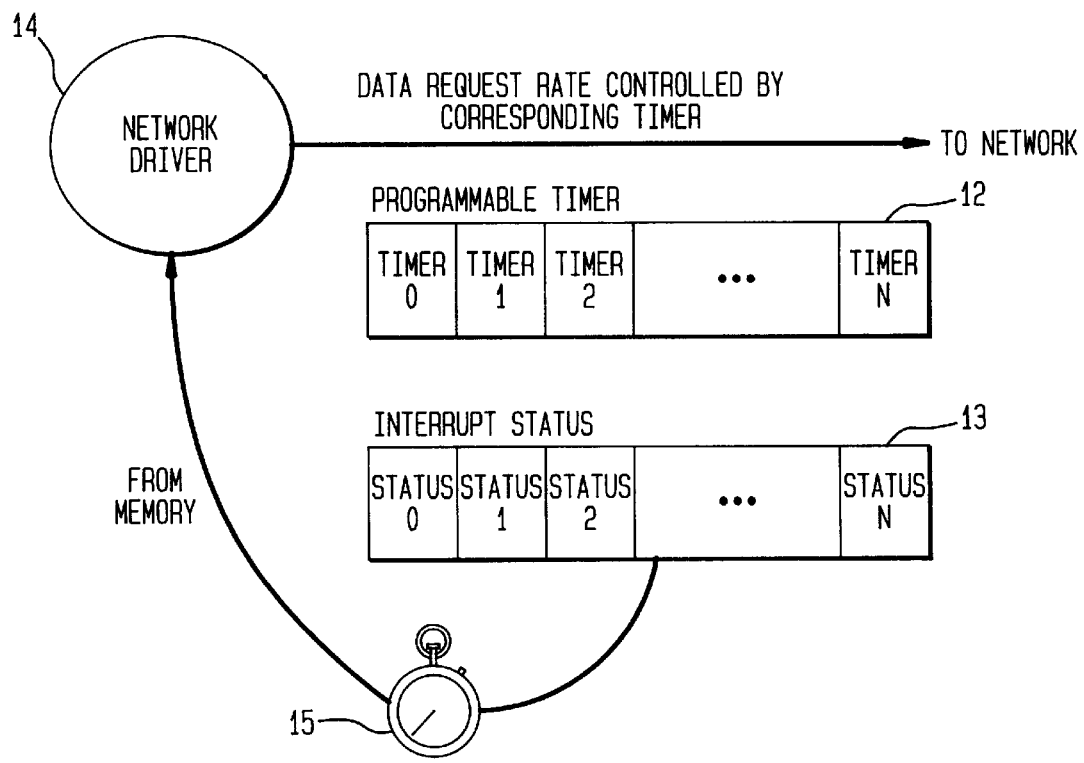
FIG. 4 illustrates the relationship of the network driver with respect to the timers according to the present invention.

At step 30, the allocated timer is programmed, preferably as discussed above, according to the data characteristics of the request, i.e., based on the available data rate. Note that during subsequent data transmission, the data rate can be dynamically changed, based on subsequent information by the requesting client. In the preferred embodiment of the present invention, two timer rates are supported, one for an MPEG I data stream and another for an MPEG II data stream. At step 35, the programmed timer will count down to zero. When the count reaches zero, the timer will set a corresponding status bit (logic '1') in status register 13 (FIGS. 3 and 4). Note that if there are other requests demanded from other clients during the process, the MOD system will allocate a different timer for each user request.

The MOD system periodically checks the status register 13. As illustrated in FIGS. 3 and 4, if there is a "1", in any bit of the register 13, i.e., one or more bits of the register has been set, the MOD system will issue an interrupt signal to the disk driver 11 and then to the network driver 14, indicating that there is at least one request from the client.

Specifically, at step 40, a timer interrupt service routine (ISR) algorithm in the MOD system loads in and checks the status register 13. At step 45, if at least one status bit is set, then the routine continues at step 50, else returns to step 40. At step 50, the system initiates the data request service by separately setting the rates of the timers which correspond to each of the bits having been set to a "1" in the status register. Note that once the ISR of the MOD system loads in to verify the information in the status register 13, an end-of-interrupt (EOI) is triggered so that the system resets all the bits of the register to level '0'. Accordingly, a new timer interrupt (logic '1') can be sensed after the EOI is generated, if a new timer interrupt occurs after the ISR routine algorithm is executed.

At step 55, the system divides each request into a plurality of sub-requests. The transfer length of each sub-request is preferably the same, e.g., 64 KB. The designated timer then begins, at step 60. When the timer count equals zero, a timer interrupt signal is generated, at step 65. The system performs each sub-request by calling disk driver 11 for reading data, at step 70, and by calling network driver 14 for sending data to the client at a predetermined time interval (based on the timer rate), at step 75.

At the end of the sub-request data transmission, the designated timer will be set again at step 90, if step 80 determines that there are additional sub-requests. Subsequently, the timer will begin counting at step 60. When the count reaches zero, another sub-request transmission will resume. This process continues until all the data requested by the client are transmitted. Thereafter, the system may wait from the next user request at step 85.

In summary, this invention can be applied in systems which support real-time data. For example, a movie on-demand system which supports real-time playback; a home shopping system which supports real-time products introduction; and a video-based real-estate program which supports 3-D virtual reality animation. In such systems, real-time data pumping, i.e., data transmission without jitter, is guaranteed.

Finally, the above-discussion is intended to be merely illustrative of the invention. Numerous alternative embodiments may be devised by those having ordinary skill in the art without departing from the spirit and scope of the following claims.

The claimed invention is:

1. A method of retrieving data requested by at least one user in a Media-On-Demand (MOD) system, comprising the steps of:

receiving a selected bandwidth rate from each said user;

allocating a timer for each requested data;

setting each said timer of said requested data based on said bandwidth rate; and retrieving said requested data when each corresponding timer expires.

2. A method of retrieving and transmitting data requested by at least one user in a Media-On-Demand (MOD) system, said data being transmitted in data streams to each said user, comprising the steps of:

receiving a selected bandwidth rate from each said user;

allocating a timer for each said data stream of said requested data;

setting each said timer of said data stream based on said bandwidth rate;

retrieving each said data stream of said requested data when each corresponding timer expires; and transmitting each retrieved data stream to said at least one user.

3. The method of claim 2, further comprising the steps of:

generating a status flag in a status register when each said timer expires; and initiating an interrupt signal to retrieve said data stream.

4. The method of claim 3, wherein a network driver transmits each said retrieved data stream.

5. The method of claim 3, further comprising the steps of:

dividing said requested data into a plurality of sub-request data streams each having a predetermined bit length, wherein each said timer corresponds to each sub-request data stream.

6. The method of claim 5, wherein said steps of receiving said bandwidth rate, dividing said requested data, allocating said timer, setting each said timer, generating said status flag, initiating said interrupt signal, retrieving each said data stream, and transmitting each retrieved data stream are performed at a server site in said MOD system.

7. The method of claim 2, wherein each said timer being a hardware timer.

8. The method of claim 2, wherein each said timer being a time clock of an operating system.

9. The method of claim 2, wherein said step of setting each said timer programs said timers using conventional VCR functions being at least one of play, pause, fast forward, rewind and stop.

* * * * *